(12) United States Patent
Hite

(10) Patent No.: US 6,533,506 B1
(45) Date of Patent: Mar. 18, 2003

(54) ADJUSTABLE HOLLOW MILLING TOOL HAVING CONSTANT RADIAL RAKE ANGLE, CONSTANT AXIAL RAKE ANGLE, AND CONSTANT RADIAL AND AXIAL CLEARANCE ANGLES AT ALL CUTTING DIAMETERS

(75) Inventor: Kevin E. Hite, Rochester, NY (US)

(73) Assignee: Genesee Manufacturing Company, Inc, Rochester, NY (US)

( * ) Notice: Subject to any disclaimer, the term of this patent is extended or adjusted under 35 U.S.C. 154(b) by 3 days.

(21) Appl. No.: 09/585,523

(22) Filed: Jun. 1, 2000

(51) Int. Cl.$^7$ ................................. B23C 5/20
(52) U.S. Cl. ............ 408/153; 408/158; 408/197; 408/203.5; 407/36
(58) Field of Search .............. 407/35, 36, 37, 407/38, 39, 40, 42, 43, 44, 45, 47; 82/130; 408/203.5, 153, 157, 197, 198, 154, 158, 163

(56) References Cited

U.S. PATENT DOCUMENTS

| | | | | |
|---|---|---|---|---|
| 759,425 A | * | 5/1904 | Elmiger | 408/158 |
| 887,992 A | * | 5/1908 | Wanderly | 408/197 |
| 1,165,859 A | * | 12/1915 | Ebert | 408/153 |
| 1,244,665 A | * | 10/1917 | Watson | 408/153 |
| 1,300,158 A | * | 4/1919 | Geitner | 408/197 |
| 1,445,448 A | | 2/1923 | Reisinger | |
| 2,097,898 A | * | 11/1937 | Severson | 408/158 |
| 2,517,668 A | * | 8/1950 | Howald | 407/35 |
| 2,998,736 A | * | 9/1961 | Cloutier et al. | 408/153 |
| 3,644,050 A | * | 2/1972 | Schiller | 408/197 |
| 5,810,519 A | * | 9/1998 | Voget et al. | 407/114 N |
| 5,947,650 A | * | 9/1999 | Satran et al. | 407/113 |

* cited by examiner

Primary Examiner—Henry Tsai
(74) Attorney, Agent, or Firm—Neal L. Slifkin; Harris Beach LLP

(57) ABSTRACT

A hollow milling tool which is adjustable through a wide range of cutting diameters while maintaining a constant radial rake angle, constant axial rake angle, constant axial clearance angle, and a constant radial clearance angle. The tool includes at least one slot, and preferably three or more slots, disposed at a negative axial rake angle with respect to the centerline of the tool for receiving and mounting a cutting member. Each slot intersects the front axial face of the tool at a location ahead of a plane including the centerline of the tool. A cutting member is a holder for a formed carbide cutter insert. The insert is mounted in the holder such that the forward face of the insert forms an angle with the forward surface of the insert holder which is at least equal and opposite to the negative axial rake angle of the slot so that the face of the insert has either zero or positive axial rake.

17 Claims, 9 Drawing Sheets

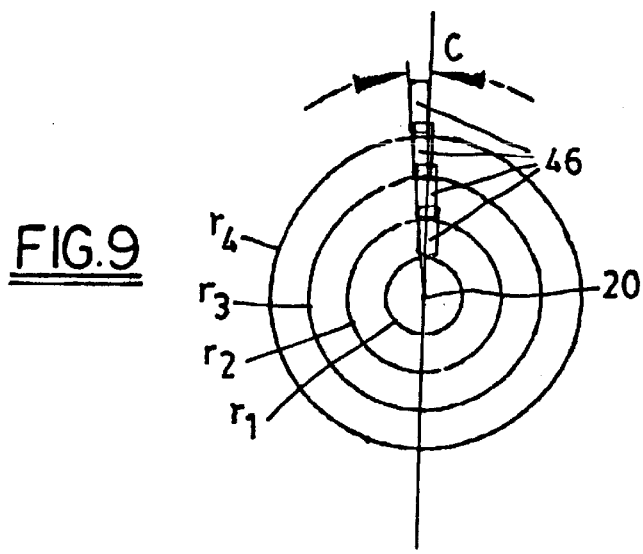
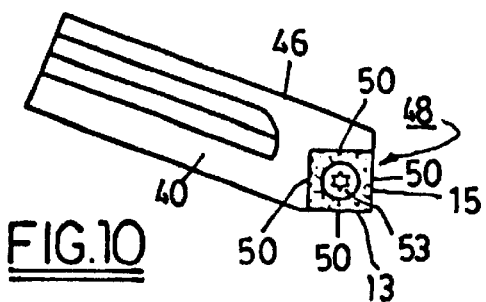
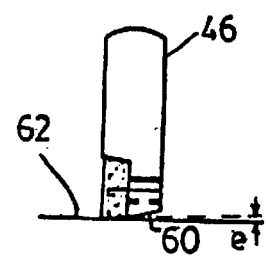
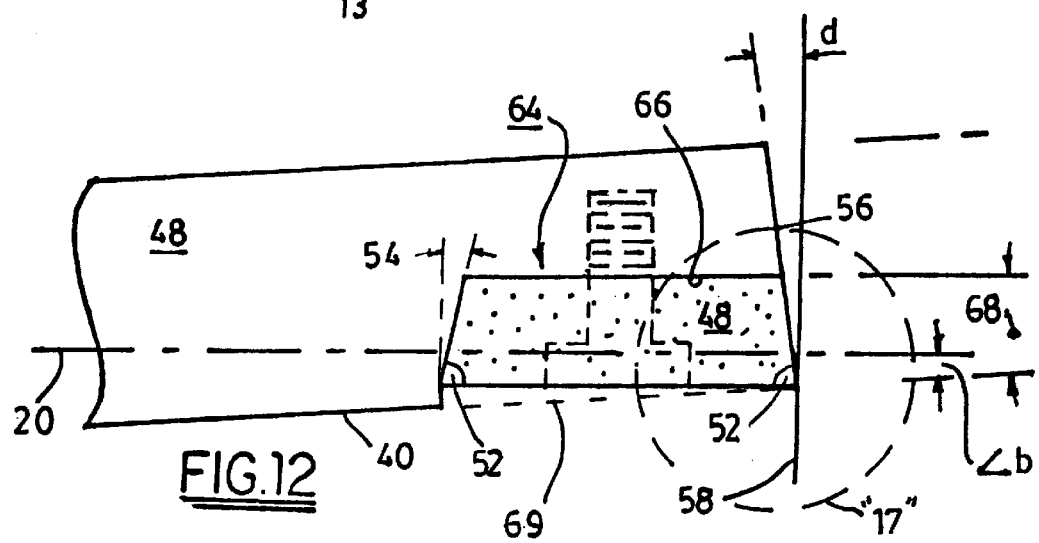

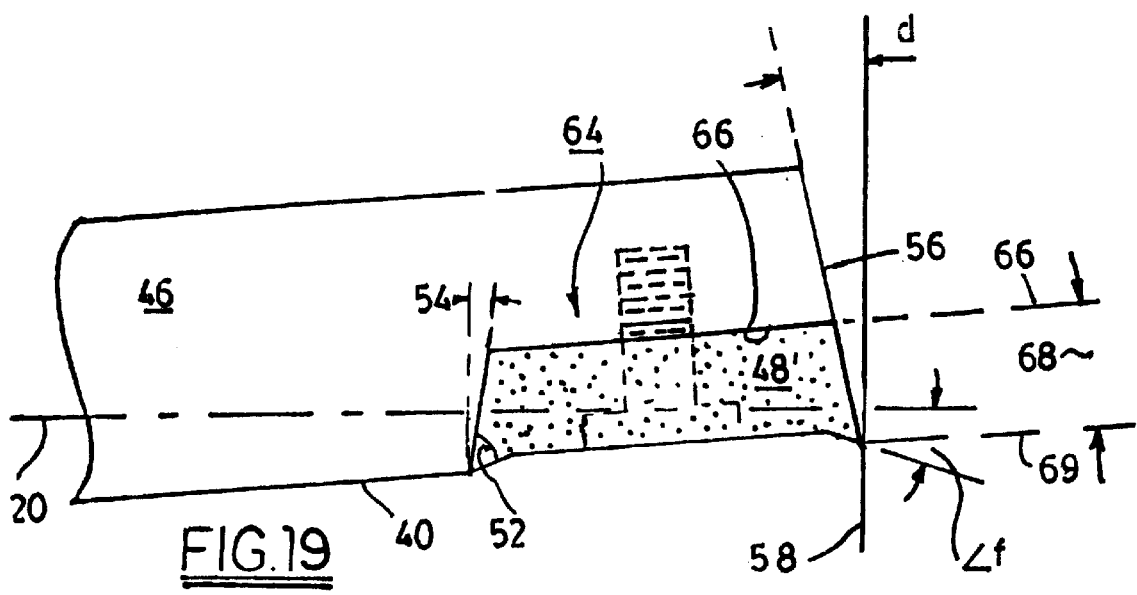

ADJUSTABLE HOLLOW MILLING TOOL HAVING CONSTANT RADIAL RAKE ANGLE, CONSTANT AXIAL RAKE ANGLE, AND CONSTANT RADIAL AND AXIAL CLEARANCE ANGLES AT ALL CUTTING DIAMETERS

DESCRIPTION

The present invention relates to milling tools for rotary machining of objects; more particularly, to hollow milling tools for forming generally cylindrical features on the outer surfaces of objects; and most particularly, to a hollow milling tool having blades which are adjustable to provide a range of cylinder cutting diameters, wherein the axial and radial rake angles of the cutting edges with respect to the centerline of the workpiece, and the radial and axial clearance angles of the cutting edges with respect to the cut surfaces of the workpiece, are constant over the range of cutting diameters of the milling tool.

Hollow milling tools, also referred to herein as hollow mills, are well known in the art of machining, See, for example, U.S. Pat. No. 887,992 issued May 19, 1908 to Wonderly; U.S. Pat. No. 1,244,665 issued Oct. 30, 1917 to Watson; and U.S. Pat. No. 1,445,448 issued Feb. 13, 1923 to Reisinger. In general form, a hollow mill includes a longitudinal, generally cylindrical body having a shank at one end for insertion into a driven chuck and having an axial bore terminating in an opening at the other end into which a workpiece may be entered progressively during machining thereof. Typically, the outer surface of the body is provided with at least one slot cut at specific radial and axial angles with respect to the centerline of the tool for receiving and mounting a cutting member generally axially and diagonally to form a work zone adjacent to the axial opening. The cutting member may be a blade formed with one or more desired angles of the cutting edges, or the member may be a holder for a blade insert such as a formed carbide cutter. Preferably, a mill includes a plurality of identical slots and associated cutting members disposed in radial symmetry about the axis. The bottom of each slot is inclined to the tool axis, typically at an included angle of 20°, so that virtual extensions of the cutting members intersect at the axis. Each cutting member is held in its respective slot by a positive clamping mechanism. Typically, the mill body includes threads on its outer surface and is provided with a threaded knurled ring which bears on the non-cutting ends of the cutting members, as they extend beyond the body, to adjust the longitudinal position of the cutting members to effect a desired diameter of the cutting edges.

Within the known art, a cutting tool is said to have "rake" when the tool face, or surface against which the chips bear as they are severed, is inclined from the axis of the tool for either increasing or diminishing the keenness or bluntness of the edge. If the inclination of the tool face is such as to make the cutting edge keener than when the rake angle is zero, the rake is said to be positive. Conversely, if the effect is to make the edge less keen than when the rake is zero, the rake is said to be negative. The magnitude of the rake is measured by two angles commonly known in the art as the "axial rake angle" and the "radial rake angle."

In a hollow mill cutting tool, the angle formed between a plane including the forward surface (tool face) of the cutting member and the centerline of the workpiece (coincident with the axis of the mill) is the axial rake angle. The angle formed between the position of the tip (intersection of the axial and radial cutting edges) of the cutting member as it lies on the workpiece and the centerline of the workpiece (again coincident with the axis of the mill) is the radial rake angle.

If the hollow mill has zero cutting rake, the tool face of the cutting member is parallel to the centerline of the workpiece and the tip of the cutting member lies on the centerline of the workpiece. If the mill has positive axial rake, the tool face is inclined toward the direction of rotation of the tool. If the mill has positive radial rake, the tool tip lies on the workpiece ahead of the centerline of the workpiece.

In the known art, axial and radial rake angles are established by cutting the slots in the mill body at the desired angles such that a cutting member when mounted will assume the correct rake angles. Further, the cutting members are provided at a correct length such that each cutting tip is disposed at a desired location with respect to the centerline of the workpiece, typically on or slightly ahead of a plane through the centerline of the workpiece. "Ahead" corresponds to "in the direction of rotation of the tool."

Other angles of importance are the clearance angles behind the radial and axial cutting edges. Typically, the included angle in the cutting edges is slightly less than 90° to promote clean cutting and to prevent possible binding of the tangent side of the cutter with the workpiece. This is especially important in positive radial rake mills wherein the radial clearance angle must at least equal the positive radial rake angle; otherwise, the cutting edge cannot make contact with the workpiece.

A problem arises in known mills having adjustable cutters mounted with positive or zero axial rake and positive radial rake, however. Typically, the slots in the mill body are cut such that the forward surface of the slot lies in a plane either at zero axial rake or at a positive axial rake. A blade or insert holder installed in such a slot assumes the fixed axial rake angle of the slot at all cutting diameters of the blade, but the radial rake angle and the radial clearance angle must change as the blade is moved diagonally along the slot to change the cutting diameter of the tool. Therefore, a prior art positive rake angle tool has almost no diameter adjustability, the range being only about 0.050 inches or less. Each prior art positive rake hollow mill must be provided with a dedicated set of cutting members specifically shaped to engage a workpiece at a particular very narrow range of diameters. Cutting members are not exchangeable between prior art mills, and a large number of different-sized mills and/or cutters are required to mill a wide range of diameters.

What is needed is a hollow mill which is readily adjustable for cutting over a wider range of diameters at a constant axial rake angle, constant radial rake angle, and constant radial and axial clearance angles.

It is a principal object of the invention to provide an improved adjustable hollow mill wherein the axial rake angle, radial rake angle, and axial and radial clearance angles are constant over the range of adjustment of the mill.

It is a further object of the invention to provide an improved adjustable hollow mill having constant axial rake angle, constant radial rake angle, and constant clearance angles wherein the ratio of the minimum diameter to the maximum diameter which may be milled is at least 1:2.

It is a still further object of the invention to provide an improved adjustable hollow mill having constant axial rake angle, constant radial rake angle, and constant axial and radial clearance angles wherein the range of diameter size adjustability is at least 0.25 inches.

Briefly described, an adjustable hollow milling tool embodying the invention includes a longitudinal body having a shank at one end for insertion into a rotationally-driven chuck and having an axial bore terminating in an opening at the other end into which a workpiece, either rotating or stationary, may be entered progressively during machining thereof. The body is provided with at least one slot, and preferably three or more slots, cut at a negative axial angle with respect to the centerline of the tool for receiving and mounting a cutting member. The slot intersects the front face of the tool at a location ahead of a plane including the centerline of the tool. The cutting member may be a blade formed with one or more desired angles of the cutting edge, and preferably the member is a holder for a cutter insert such as a formed carbide indexable insert. Preferably, the insert is mounted in the insert holder such that the forward face of the insert forms an included angle with the forward surface of the insert holder which is at least equal and opposite to the negative axial rake angle of the slot, so that the forward face of the insert is at least parallel to or ahead of a plane containing the centerline (zero or positive axial rake of the cutter insert). Each insert holder is held in its respective slot by a positive clamping mechanism. The mill body is threaded on its outer surface and is provided with a threaded knurled ring which bears on the non-cutting ends of the insert holders, as they extend beyond the body, to move the insert holders in the slots to a desired cutting diameter of the cutting edges. The negative axial rake angle of the slot and the point of intersection of the slot with the tool face are selected such that the cutting edge is positioned at a desired positive radial rake angle and neutral or positive axial rake angle with positive radial and axial clearance angles, such that the radial rake angle, axial rake angle, and radial and axial clearance angles are constant over all diameters through which the milling tool is adjustable.

The foregoing and other objects, features, and advantages of the invention, as well as presently preferred embodiments thereof, will become more apparent from a reading of the following description in connection with the accompanying drawings in which:

FIG. 9 is an axial view of a schematic workpiece milled to four different diameters, showing the position of the cutting insert at each diameter and the constant radial rake angle of the insert with respect to the workpiece at all diameters, in accordance with the invention;

FIG. 10 is a side elevational view of an indexable insert holder in accordance with the invention;

FIG. 11 is an end view of the indexable insert holder shown in FIG. 10;

FIG. 12 is a detailed plan view of a cutter insert disposed in the indexable insert holder shown in FIG. 7;

Figure 3:
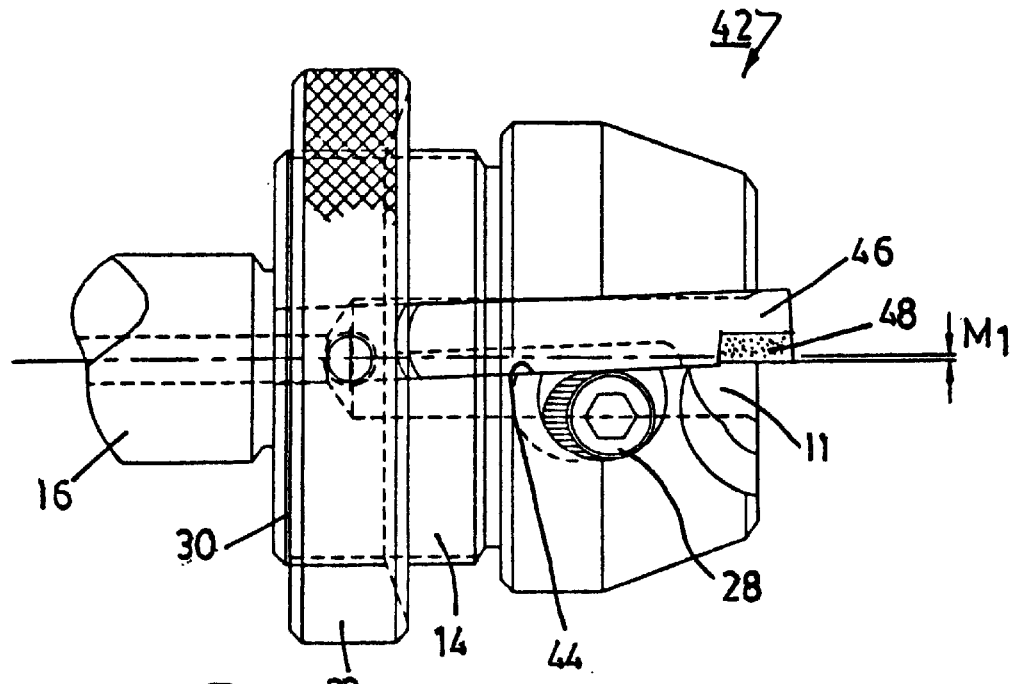
FIG. 3 is a cross-sectional view of an adjustable hollow milling tool in accordance with the invention, showing the insert holder fully retracted for maximum cutting diameter (only one holder is shown, for clarity)
Figure 6:
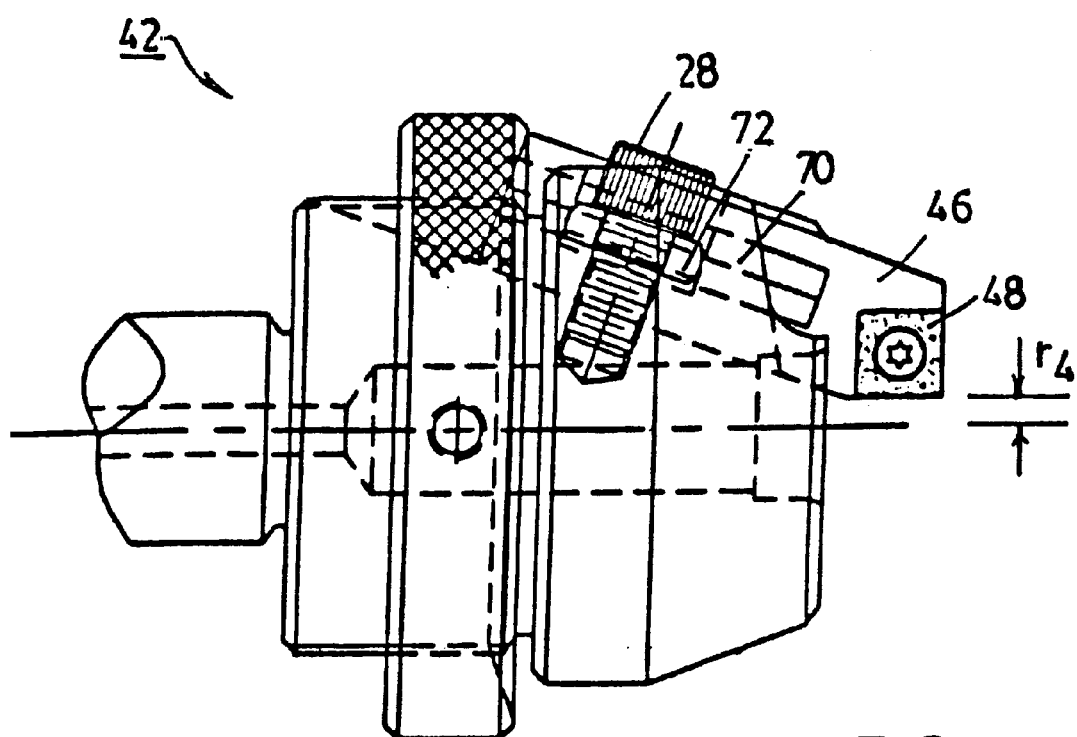
FIG. 6 is a cross-sectional view of the tool shown in FIG. 5 after the tool has been axially rotated 90°.
Figure 16:
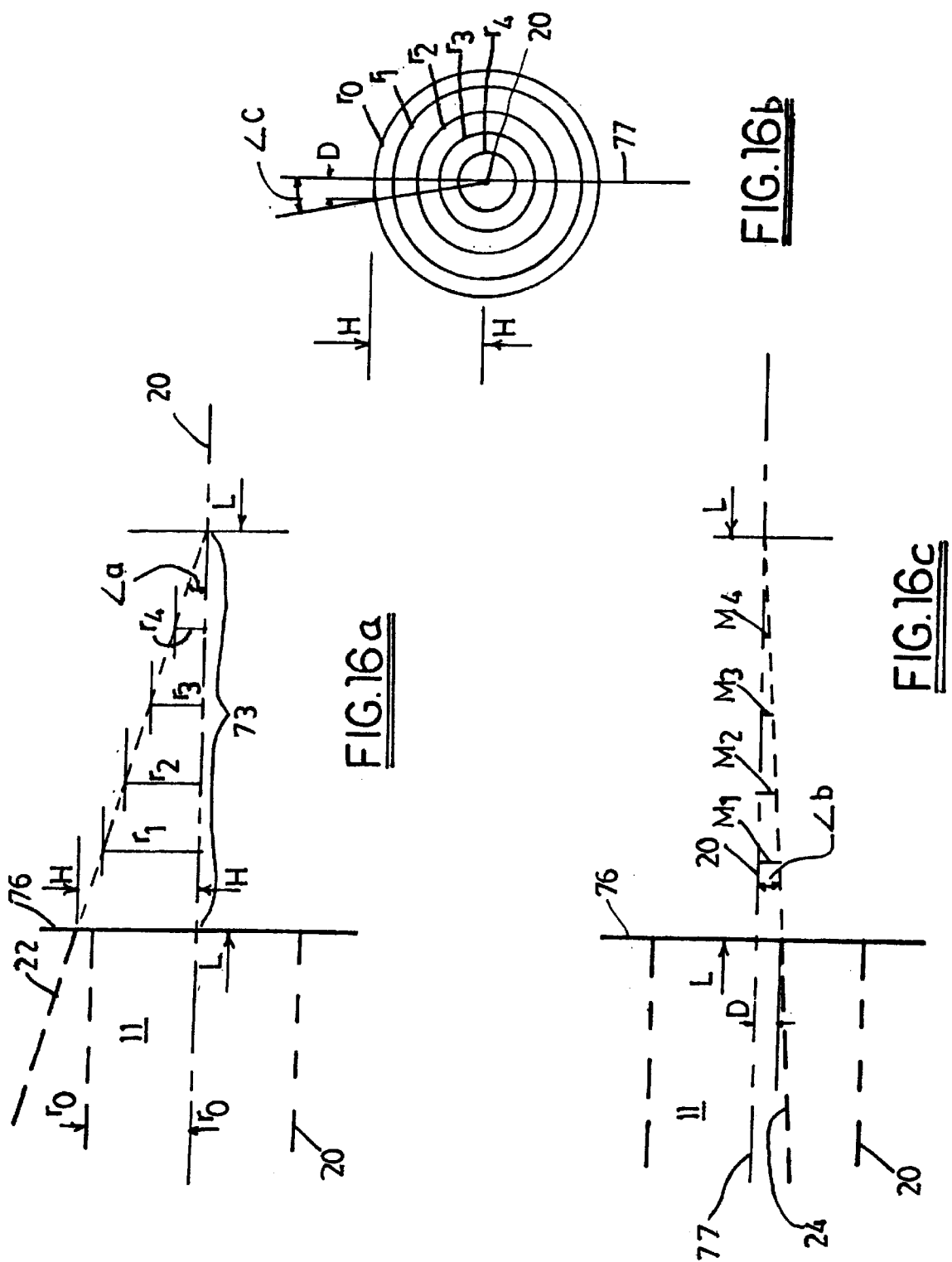
Figure 17:
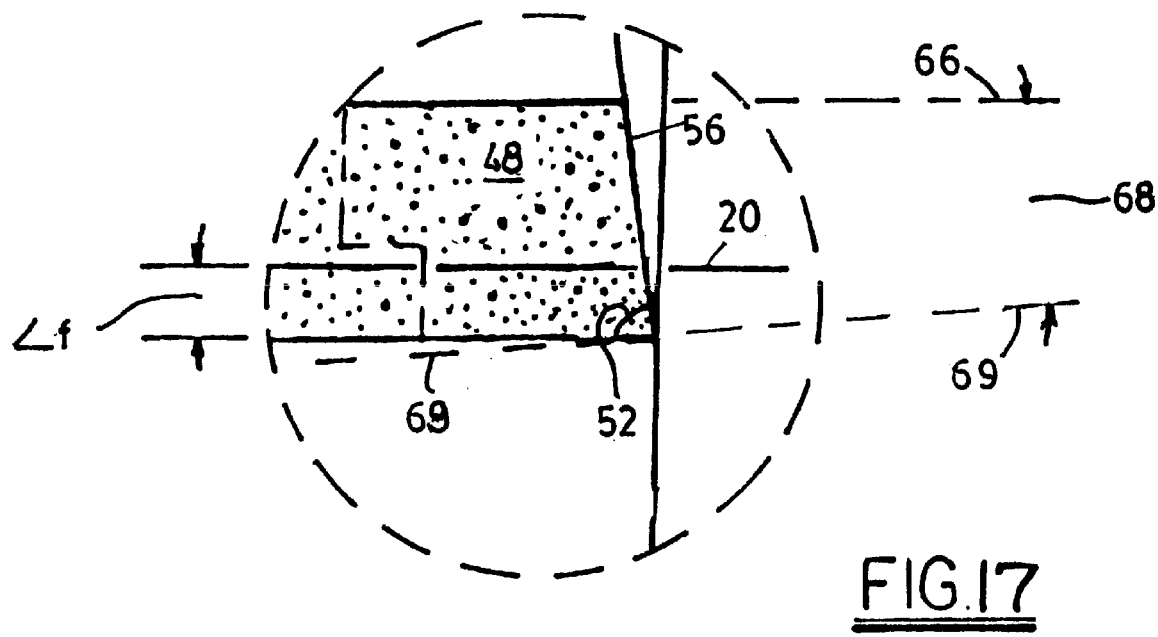
Figure 18:
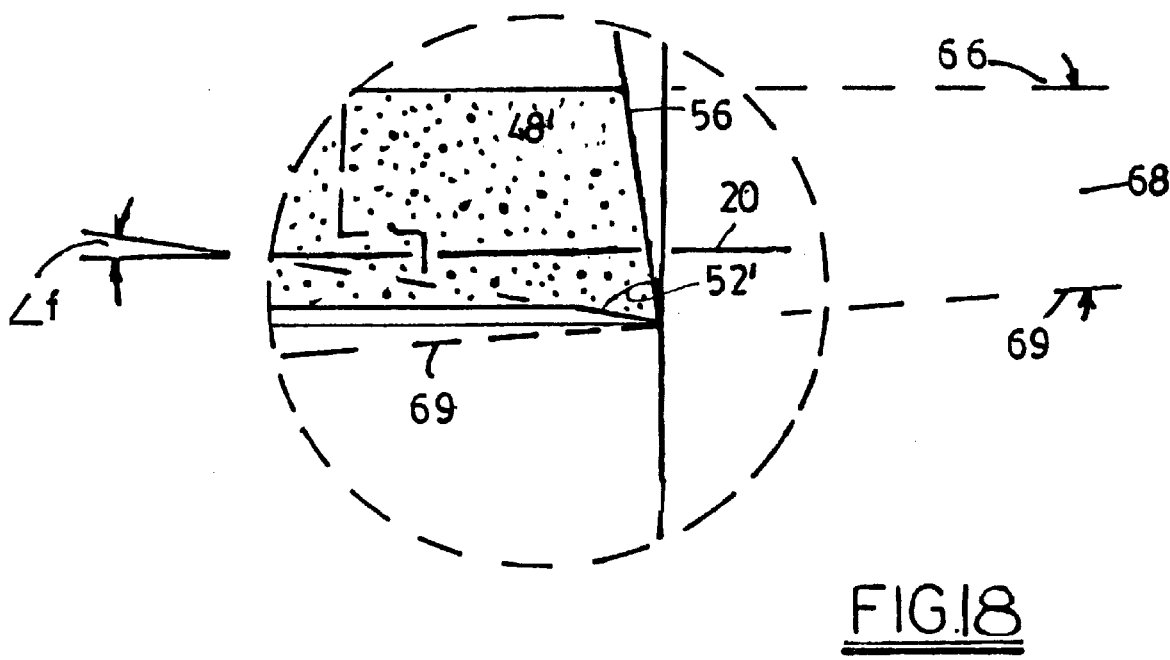

FIGS. 16a, 16b, and 16c are schematic representations of the views shown in FIGS. 6, 9, and 3, respectively, showing lengths and angles for determining proper positioning of a negative axial rake slot in a tool body;

FIG. 17 is an enlarged view of a portion of FIG. 12 designated therein within circle "17";

FIG. 18 is a view like that shown in FIG. 17, showing an alternative configuration of an indexable cutter insert in an insert holder; and FIG. 19 is a view like that shown in FIG. 12, showing another alternative configuration of an indexable cutter insert in an insert holder.

Figure 1:
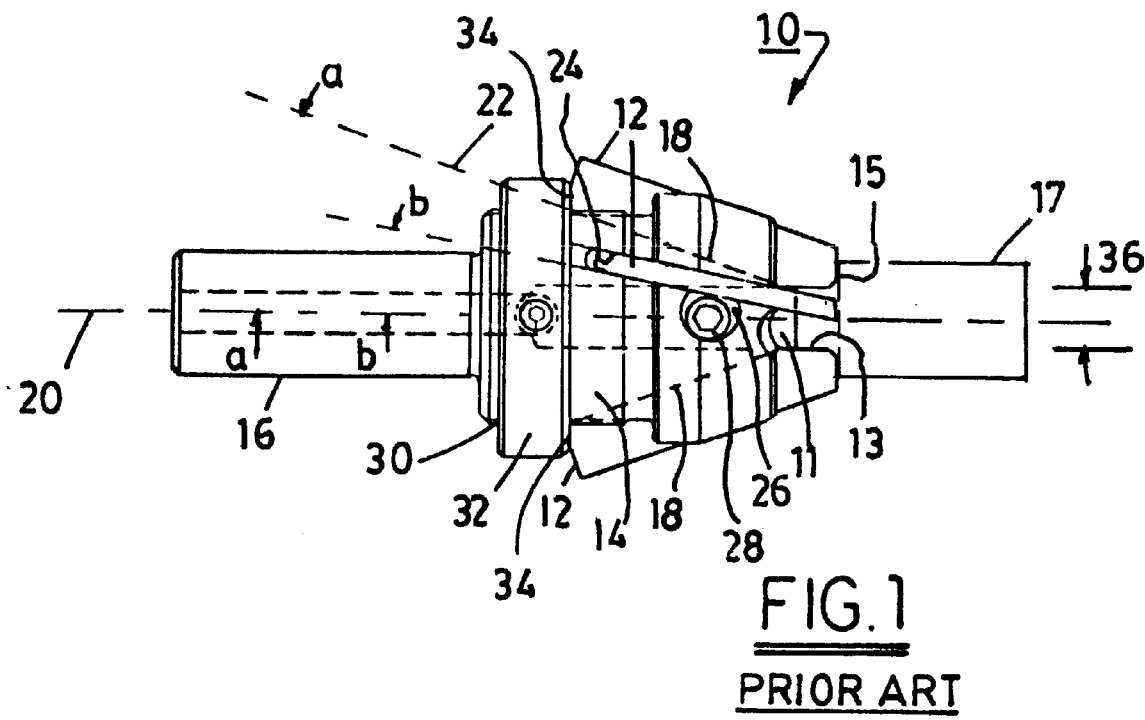
FIG. 1 is a cross-sectional view of a first prior art adjustable hollow milling tool having positive axial rake slots.
Figure 5:
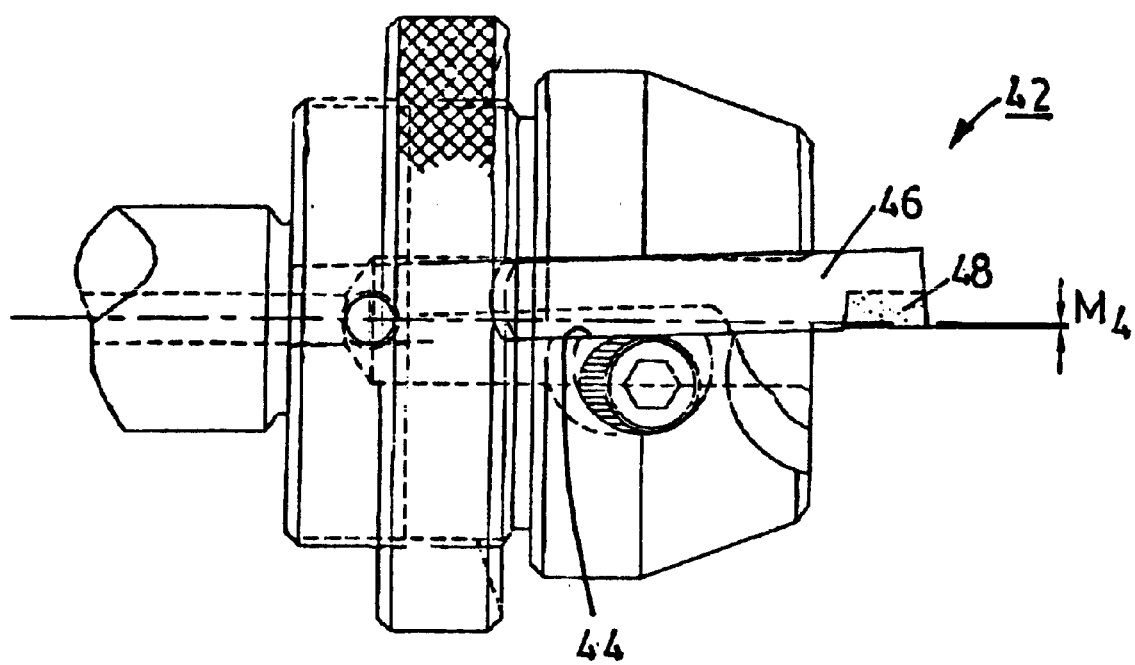
FIG. 5 is a cross-sectional view of the adjustable hollow milling tool shown in FIG. 3, showing the insert holder fully extended for minimum cutting diameter.

Referring to FIG. 1, there is shown a first prior art hollow milling tool 10 having positive axial rake of the blade 12. Tool 10 includes a generally cylindrical body 14 terminating at a first end in a cylindrical shank 16 for insertion into a chuck for rotation, for example, a lathe chuck. At the opposite end, body 14 is provided with an axial bore 11 for receiving the milled portion of a workpiece as the mill is moved progressively along the workpiece 17. Body 14 is further provided with four slots 18 eccentrically spaced for receiving four generally tabular individual blades 12, each having a radial cutting edge 13 and an axial cutting edge 15. By "eccentrically spaced" is meant herein that the slots are radially spaced from each other at other than 90° intervals, which configuration is provided in the known art to reduce chattering of the cutting edges against a workpiece. With respect to the axis 20 of the tool, the bottoms 22 of slots 18 are inclined at a first angle a, known in the art as the cutter adjustment angle; and sidewalls 24 of slots 18 are inclined at a second angle b, known in the art as the axial slot angle. When blade 12 is angled toward the direction of rotation of the mill, as shown in FIG. 1, the axial slot angle is said to be positive. Likewise, when blade 12 is angled away from the direction of rotation of the mill, as shown in FIGS. 3 and 5, the axial slot angle is said to be negative. Each blade 12 is retained in its designated slot by an eccentric washer 26 and a cap screw 28 threaded into body 14. Washer 26 engages a rectangular groove (not shown) in blade 12 and urges blade 12 toward bottom 22 of slot 18. Body 14 is further provided with a region of circumferential threads 30 (not visible in FIG. 1) for accommodating a threaded adjustment ring 32 which may be advanced into contact with the non-cutting ends 34 of blades 12 for advancing or retracting blades 12 in slots 18 to adjust the distance 36 between opposing edges 15 and hence the finish diameter of a milled workpiece.

Figure 2:
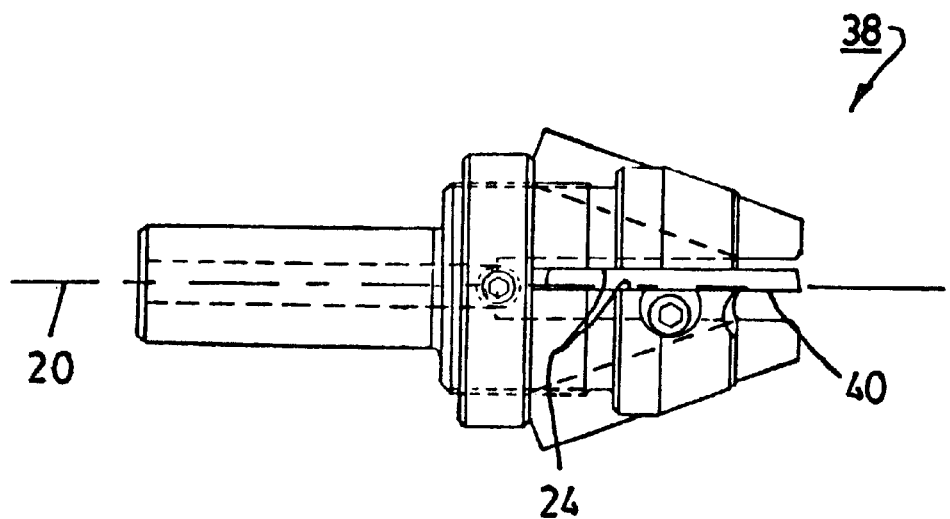
FIG. 2 is a cross-sectional view of a second prior art adjustable hollow milling tool having zero axial rake slots.

Referring to FIG. 2, a second embodiment 38 of a prior art hollow milling tool is similar in design to tool 10 except that slot sidewalls 24 are disposed in planes parallel with a plane containing axis 20. Such a tool has neutral axial rake due to the zero axial slot angle b. Preferably, for superior cutting, the leading face 40 of blade 12 is disposed a distance M ahead of (in the rotational sense) top-dead-center such that an extension of radial cutting edge 13 does not intersect axis 20, as shown in FIG. 2. This is known in the art as cutting over-center and is highly desirable in both a zero axial rake blade and a positive axial rake blade. The amount the blade extends over center may be expressed as a radial rake angle c formed by edge 13, axis 20, and the top-dead-center position, as discussed more fully below.

Prior art mills 10 and 38 are available from, for example, Genesee Manufacturing Company, Rochester, N.Y. USA.

As is known to those skilled in the art, a radial rake angle c of about +6° provides excellent cutting. However, all known zero axial rake and positive axial rake mills can provide this or any other specified overcenter angle at only one extension position of the blades. For zero axial rake mills like mill 38, retraction of the blades to cut a larger diameter moves the cutting edge parallel to the top-dead-center position, thus reducing the radial rake angle c as the diameter increases, although the value remains positive. For positive axial rake mills, retraction of the blades rapidly reduces the radial rake angle and can lead ultimately to a negative radial rake angle as the cutting edge approaches and crosses the top-dead-center position, which is undesirable. Thus, although known mills are said to be "adjustable" to accommodate varying milling diameter requirements, the range of adjustment over which the radial rake angle is acceptable is quite small. For a positive axial rake mill such as 10, the practical range of cutting diameters available is about 0.050 inch or less (slightly more for neutral axial rake mills).

It is readily seen by inspection, and demonstratable by geometry, that the only way to cause the cutting edge to move away from the top-dead-center position as the blade is retracted, as shown in FIG. 9, and to still maintain a constant positive radial rake angle c, is to cut slots 18 into body 14 at a negative axial slot angle b. Unfortunately, as is known in the art, presenting cutting edge 15 to an axial workpiece face at a negative axial rake angle is an inferior and undesirable cutting geometry. In fact, for this reason no known mills are provided having negative axial slot angles.

Referring to FIGS. 3–16c, a novel hollow milling tool 42 in accordance with the invention includes a body 14, shank 16, threads 30, and adjustment ring 32 generally as described previously for prior art mills 10 and 38. Mill 42 overcomes the cited adjustability problems with zero- and positive-rake mills, however, by providing a cutting member which is disposed desirably at a zero or positive axial rake angle to an axial workpiece face and at a positive radial rake angle to the centerline of the workpiece, but which is moved during adjustment with negative axial rake motion according to a negative axial angle slot 44, thereby maintaining a constant positive or neutral axial rake angle and a constant positive radial rake angle at all cutting diameters within the scope of the tool capacity. Thus, diameter ratios of 2:1 or greater (for example, a minimum diameter of ¼ inch and a maximum diameter of ½ inch) may readily be provided by mills in accordance with the invention.

A novel cutting member is required to provide these combined properties. Forming and maintaining a plurality of identical cutting members, however, is extremely difficult, costly, and time-consuming. Preferably, the simple planar prior art blade 12 is replaced in the present invention by a combination insert holder 46 and cutter insert 48, as shown in FIGS. 3–12. In a currently preferred embodiment of such a cutting member, a pocket which holds an indexable cutter insert is formed at an angle to the body of the member, which angle is opposite and at least equal to the negative axial rake angle of the slot, whereby axial cutting edge 15 is disposed desirably at zero or positive axial rake angle.

Figure 7:
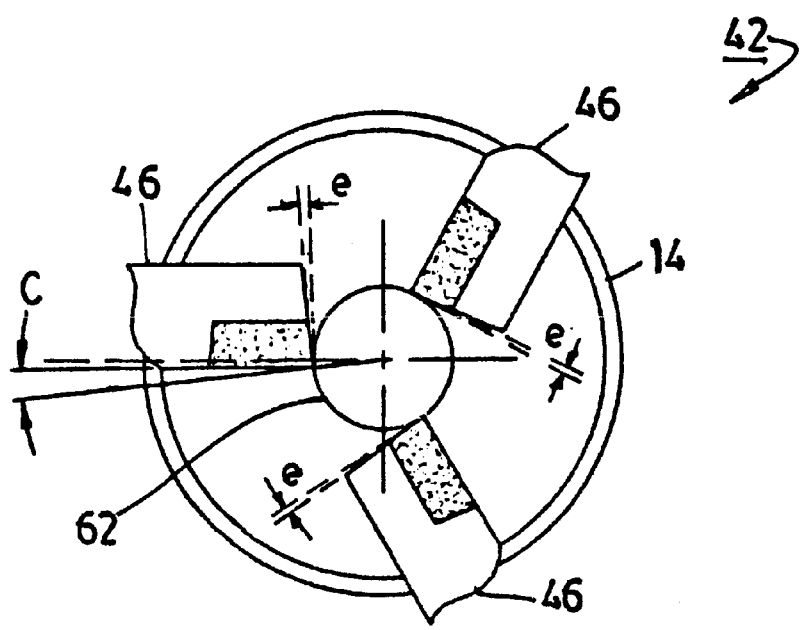
FIG. 7 is an end view of the tool shown in FIG. 3, showing the positive radial rake relationship of the cutting inserts to radii of the workpiece at maximum cutting diameter, and the radial clearance angle with respect to the cylindrical surface of the milled workpiece.
Figure 8:
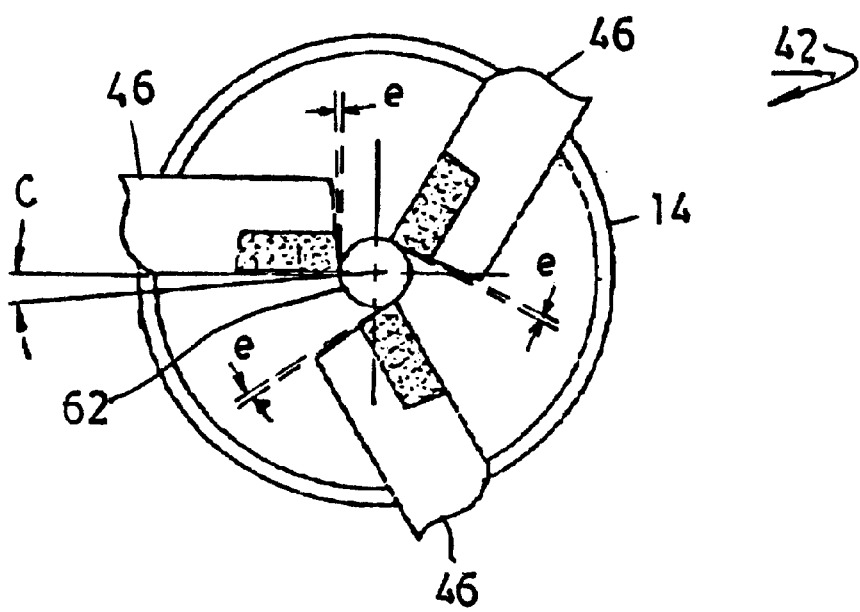
FIG. 8 is an end view of the tool shown in FIG. 5, showing the positive radial rake relationship of the cutting inserts to radii of the workpiece at minimum cutting diameter, and the radial clearance angle as in FIG. 7.
Figure 13:
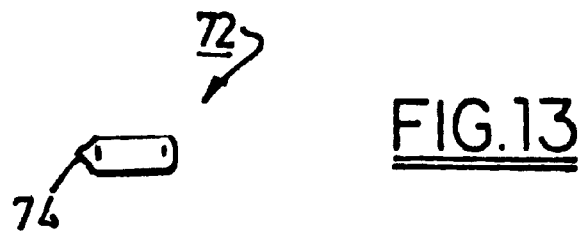
FIGS. 13 and 14 are a side view and a plan view, respectively, of a clamping washer for retaining an indexable insert holder in a slot in a tool body.
Figure 14:
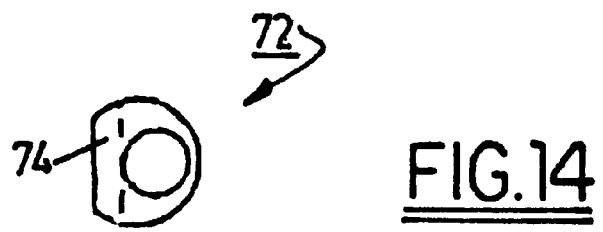

Cutter insert 48 is preferably formed of a hard mineral composite, for example any of several well known carbides. The specific insert shown as insert 48 is a ⅜-inch inscribed circle (IC) screw-on insert 0.156-inch thick, in accordance with SCMT 32.51 or 32.52, which is an internationally established standard (ISO) insert, available from a multitude of known insert manufacturers. Insert 48 is generally square in outline, all four cutter edges 50 being equivalent; however, the principles of the invention apply equally to other ISO shapes, such as triangular or diamond-shaped inserts, which may have different sizes or tolerances. A fresh edge may be brought into service by removing capscrew 53, turning insert 48 90°, and then reinstalling screw 53. Insert 48 is trapezoidal in cross-sectional profile, as shown in FIGS. 3, 5, 11, and 12. Each cutter edge 50 includes an acute angle 52 such that an angle of clearance 54 to the work is assured. Thus, in use, axial cutter edge 15 has an axial clearance angle d formed between cutter axial back face 56 and the axial face 58 of workpiece 17, as shown in FIG. 12; and radial cutter edge 13 has a radial clearance angle e formed between cutter radial back face 60 and the radial surface 62 of workpiece 17, as shown in FIGS. 7, 8, and 11.

As noted above, cutter axial edge 15 is disposed at an angle to forward face 40 of insert holder 46 to provide a zero or positive axial rake angle of the insert cutter edge 15 while the slots in the tool simultaneously provide a negative axial rake to the insert holder. This may be achieved as shown in FIGS. 3, 5, and especially 12 and 17. A trapezoidal pocket 64 is provided in insert holder 46 which is full-fitting on the two non-engaged edges 50 of insert 48. Pocket 64 further has a planar bottom 66 which is inclined from the plane of face 40 by an angle 68 at least equal to the negative axial angle b of slot 18. In the example shown in FIG. 12, and in greater detail in FIG. 17, angle 68 equals angle b because pocket bottom 66 is parallel to axis 20 so that cutter radial edge 13 is disposed parallel with axis 20 and thus has zero axial rake angle f. If angle 68 exceeds angle b, then the axial rake angle f is positive by that amount. Further, the depth of the pocket preferably is selected such that the intersection of cutting edges 13 and 15 coincides with an extension of the lower forward edge 69 of insert holder 46.

Cutter insert 48 may be provided in various configurations of included angle 52 along cutting edge 15. For example, as shown in FIG. 18, a different insert 48' has cutting edge 13 formed at an angle to axis 20 such that included angle 52' is smaller than angle 52 in FIGS. 12 and 17. The intersection of the extension of edge 13 and axis 20 is cutter axial rake angle f. As shown in FIG. 18, the cutter axial rake angle f may be positive while the slot axial angle b is negative.

Other variations in angular relationships among the various components are obviously possible. For example, as shown in FIG. 19, pocket bottom 66 may be conveniently machined to be parallel with face 40 of insert holder 46 (angle 68 is zero), yet the extension of edge 13 forms a positive axial rake angle f with axis 20.

Figure 15:
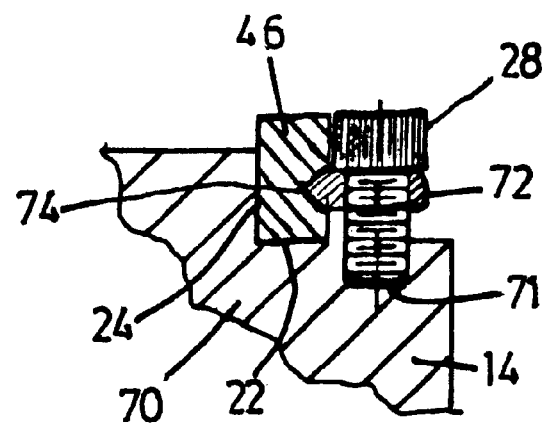
FIG. 15 is a cross-sectional view of the indexable insert holder shown in FIG. 10, showing the holder being retained in a tool body by the washer shown in FIGS. 13 and 14.

Insert holders 46 are adjustably retained in slots 18 by a novel positive clamping mechanism shown in FIGS. 4, 6, and 13–15. Each holder 46 is provided with a longitudinal triangular groove 70, the two sides of which are each incised at, preferably, 45° from surface 40 and have an included angle of 90°. An eccentric retaining washer 72 is provided with beveled flanges 74 having a bevel angle matching the incision angle of groove 70. Upon assembly with and tightening of cap screw 28 in a threaded bore 71 in body 14, holder 46 is clamped directly into the juncture of slot bottom 22 and sidewall 18, as shown in FIG. 15. This clamping mechanism is superior to the prior art mechanism described for mill 10 because the holder is urged equally against both the bottom and the sidewall of the slot, thereby clamping the holder securely in two orthogonal directions; whereas the prior art mechanism urges the blade in only one direction, against the bottom of the slot, such that the blade may chatter against the sidewalls of the slot during use.

Figure 4:
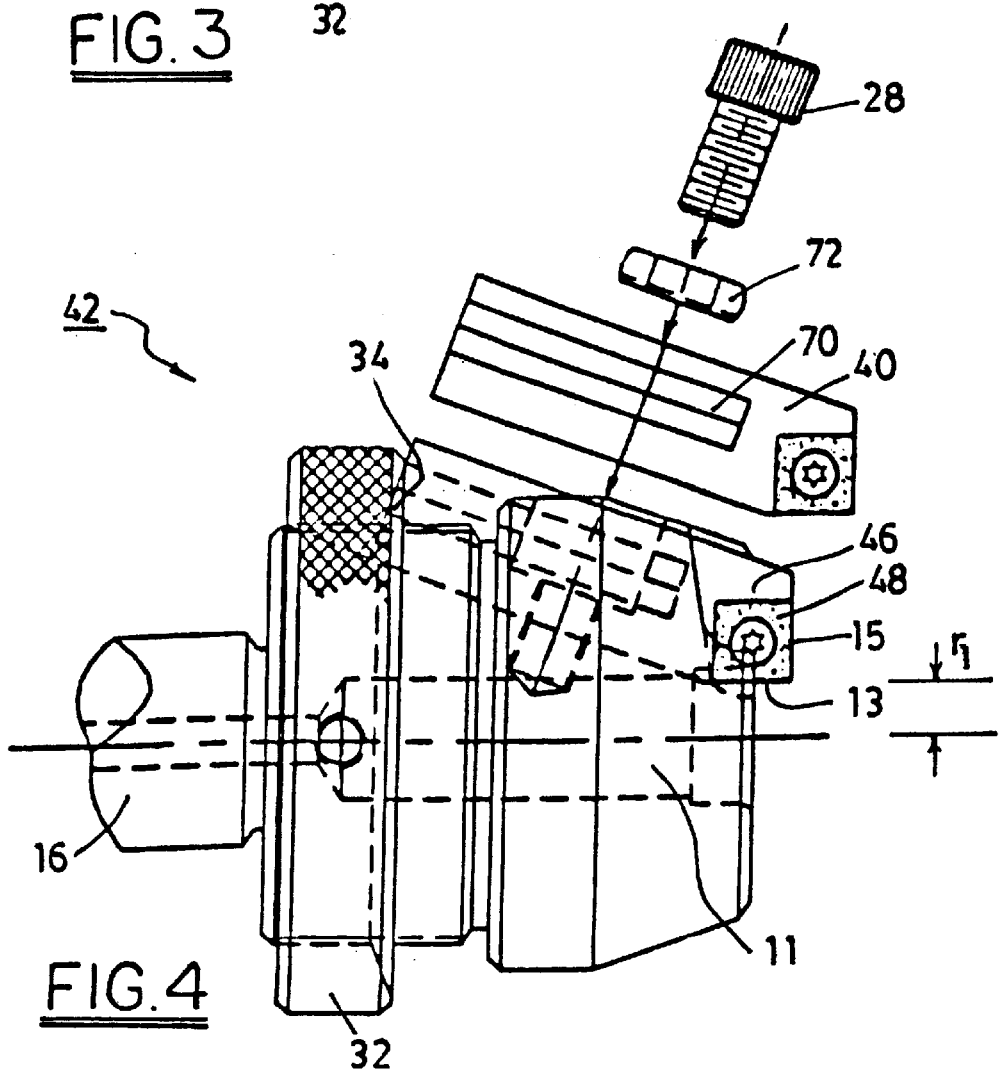
FIG. 4 is a cross-sectional view of the tool shown in FIG. 3 after the tool has been axially rotated 90°.

Referring to FIGS. 16a–16c, the dimensions of a hollow milling tool in accordance with the invention may be determined. FIG. 16a is a schematic representation of adjustable milling tool 42 as shown in FIGS. 4 and 6, showing conical work zone 73, the extension of slot bottom 22 from the tool which an insert holder follows through its adjustment range, and four representative cutting radii of the tool, $r_1, r_2, r_3,$ and $r_4$. FIG. 16b is a schematic axial view of the tool similar to the view shown in FIG. 9. FIG. 16c is a schematic representation of tool 42 as shown in FIGS. 3 and 5, showing the actual radial distances $M_1, M_2, M_3,$ and $M_4$ of a cutter insert ahead of centerline at the corresponding radii shown in FIG. 16a, based on a constant radial rake angle c.

Given the desired minimum and maximum cutting radius, a tool designer must specify the desired radius $r_0$ of the maximum diameter to be milled; the desired length L of the workzone 73 of the tool; the desired cutter adjustment angle a, and the desired radial rake angle c. The minimum radial clearance angle e must be greater than the radial rake angle c; this is controlled by proper selection of the cutter edge angle 52, as described above, and can also be altered by 66, the planar bottom of the insert pocket 64. Since the four edges of a preferred cutter insert are identical, the axial clearance angle d equals the complement of cutter edge angle 52 plus slot angle b minus angle 68, the angle of the planar bottom of the insert pocket. For the illustrated zero axial rake cutter embodiment 42, the axial clearance angle d equals the complement of cutter edge angle 52.

Using the above specification input and the following relationships, the remaining tool design variables required to position slot 18 in body 14 may be determined: the height H above centerline at which slot bottom 22 exits the tool face 76; the distance D rotationally ahead of centerline 77 at which the forward sidewall 24 of slot 18 exits the tool face 76; and the required negative axial slot angle b:

$H = L \times \tan a$ (Eq. 1)

$D = H \times \sin c$ (Eq. 2)

$\tan b = D/L$ (Eq. 3)

$b = \arctan D/L$ (Eq. 4)

EXAMPLE 1

Let cutter adjustment angle a=20°, radial rake angle c=6°, workzone length L=0.822 inches, cutter edge included angle=83°, and cutter axial rake angle f=0°. Then H=0.299 inches, D=0.03125 inches negative, axial slot angle b=2° 11', axial clearance angle d=7°, and radial clearance angle e=7°.

EXAMPLE 2

Same as Example 1 except angle a=40°. Then H=0.690 inches, D=0.0725 inches, and angle b=5° 03'.

Each of these tools will have a constant axial rake angle of zero, constant radial rake angle c, a constant axial clearance angle d, and a constant radial clearance angle e over the full range of cutting radii from $r_1$ to 0.

From the foregoing description, it will be apparent that there has been provided an improved hollow milling tool which is adjustable through a wide range of cutting diameters while maintaining a constant radial rake angle, constant axial rake angle, constant axial clearance angle, and a constant radial clearance angle. Variations and modifications of the herein described hollow milling tool, in accordance with the invention, will undoubtedly suggest themselves to those skilled in this art. Accordingly, the foregoing description should be taken as illustrative and not in a limiting sense.

What is claimed is:

1. An adjustable hollow milling tool for milling stock, comprising:
   a) a longitudinal body having an axis;
   b) at least one slot formed in said body, said slot having a bottom surface disposed in a plane intersecting the axis of said body at a cutter adjustment angle (a), said slot having a sidewall contained in a plane intersecting said axis at a negative axial slot angle (b); and
   c) a cutting member having a longitudinal axis and being adjustably disposed in said at least one slot and being adjustable along said slot toward and away from said body axis, said member having means for cutting said stock disposed in angular relationship to said body axis defining an axial rake angle (f).

2. A tool in accordance with claim 1 wherein said axial rake angle (f) is opposite in sign, and equal in magnitude, to said negative axial slot angle (b), said cutting means being disposed in a plane inclusive of said axis of said body and forming a zero axial rake angle therewith.

3. A tool in accordance with claim 1 wherein said cutting means is further disposed at a positive radial rake angle (c), an axial rake angle (f) of at least zero, an axial clearance angle (d), and a radial clearance angle (e).

4. A tool in accordance with claim 3 wherein dimensions for said cutter adjustment angle (a), said negative axial slot angle (b), and said positive radial rake angle (c) are selected such that radial rake angle (c), axial clearance angle (d), axial rake angle (f), and radial clearance angle (e) are constant for all adjustment positions of said cutting member along said slot.

5. A tool in accordance with claim 1 wherein said cutting means is disposed at a positive axial rake angle (f) to said axis of said body.

6. A tool in accordance with claim 1 further comprising a plurality of said slots and a plurality of said cutting members.

7. A tool in accordance with claim 1 further comprising positive clamping means for retaining said cutting member in said slot.

8. A tool in accordance with claim 7 wherein said positive clamping means comprises:
   a) a longitudinal groove formed in a surface of said cutting member;
   b) a washer having a beveled flange, said flange being extendable into said groove; and
   c) a bolt extendable through said washer and receivable in a threaded bore in said body for urging said beveled flange against at least one surface of said groove to immobilize said cutting member in said slot.

9. A tool in accordance with claim 1 further comprising adjustment means for causing said cutting member to move longitudinally in said slot to change the cutting diameter of said tool, comprising:
 a) a region of male threads on an outer surface of said body adjacent the non-cutting end of said cutting member; and
 b) an adjustment ring having female threads formed in an inner surface thereof, said threaded ring being rotatable on said threaded body to engage said end of said cutting member on an axial face of said ring to move said cutting member longitudinally in said slot.

10. A tool in accordance with claim 1 wherein said cutting member includes a holder for said cutting means.

11. A tool in accordance with claim 10 wherein said cutting means comprises a hard, formed insert having a plurality of cutting edges.

12. A tool in accordance with claim 11 wherein said cutting edges include a radial cutting edge and an axial cutting edge, and wherein said edges intersect at substantially a right angle.

13. A method for making a slot for receiving a cutting member in a hollow milling tool body having a predetermined cutter adjustment angle (a), length of workzone (L), and cutter radial rake angle (c), comprising the steps of:
 a) determining the height (H) above the axis of the body at which the bottom of said slot intersects an axial face of said body, in accordance with the equation (H=L×tan a);
 b) determining the distance (D) from an axial plane at which a sidewall of said slot intersects said axial face of said body, in accordance with the equation (D=H×sin c); and
 c) determining the negative axial angle (b) of said slot in said body, in accordance with the equation (b=arc tan D/L).

14. A body for a hollow milling tool, wherein said body comprises a slot for receiving a cutting member in a hollow milling tool body having a predetermined cutter adjustment angle (a), length of workzone (L), and cutter radial rake angle (c) wherein said slot is formed in accordance with the method of claim 13.

15. A method for making a hollow milling tool having a cutter adjustment angle (a), an axial slot angle (b), a cutter radial rake angle (c), an axial clearance angle (d), a radial clearance angle (e), and an axial rake angle (f) wherein angles (a) through (f) are constant at all adjustable cutting diameters of the tool, comprising the steps of:
 a) selecting a cutter adjustment angle (a), length of workzone (L), and cutter radial rake angle (c);
 b) determining height (H), distance (D), and axial slot angle (b) in accordance with the method of claim 13;
 c) forming a hollow milling tool body having a longitudinal axis and having a plurality of slots in accordance with the selected cutter adjustment angle (a) and the determined height (H), distance (D), and axial slot angle (b);
 d) providing a plurality of cutter insert holders equal to the number of said slots, each of said holders having a front surface and a pocket in said front surface for receiving a cutter insert, each pocket having a planar bottom surface disposed at a predetermined angle to said front surface;
 e) providing a plurality of substantially identical cutter inserts equal in number to the number of insert holders, each insert having at least one axial cutting edge disposed at an angle to a rear surface of said insert such that when said insert is mounted in said pocket with said rear surface disposed against said pocket bottom and said insert holder is disposed in one of said slots a virtual extension of said axial cutting edge forms a constant axial rake angle (f) with said axis of said tool body, said axial rake angle (f) being at least zero, and further, said cutter insert having at least one radial cutting edge, and further, said cutter insert having an axial back face adjacent said axial cutting edge and a radial back face adjacent said radial cutting edge, included angles between said axial edge and axial back face and between said radial edge and radial back face being selected such that a positive axial clearance angle (d) and a positive radial clearance angle (e) are formed between the insert and a workpiece to be milled;
 f) mounting one of said inserts in each pocket;
 g) mounting one of said insert holders in each slot; and
 h) adjusting each insert holder to extend a common predetermined distance from said tool body.

16. A method in accordance with claim 15, further comprising the steps of:
 a) providing an equatorial threaded region on said tool body;
 b) providing insert holder adjusting means matably threaded and disposed on said threaded region of said tool body; and
 c) activating said adjusting means to carry out said adjusting step in claim 15.

17. A tool in accordance with claim 1 wherein said axial rake angle (f) is opposite in sign and greater in magnitude than said negative axial slot angle (b) such that a plane containing said cutting means intersects said axis of said body at a positive axial rake angle.

* * * * *